(12) United States Patent
Yoshimura

(10) Patent No.: US 12,374,985 B2
(45) Date of Patent: Jul. 29, 2025

(54) POWER SUPPLY APPARATUS AND IMAGE FORMING APPARATUS

(71) Applicant: CANON KABUSHIKI KAISHA, Tokyo (JP)

(72) Inventor: Shotaro Yoshimura, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 18/324,831

(22) Filed: May 26, 2023

(65) Prior Publication Data
US 2023/0393517 A1 Dec. 7, 2023

(30) Foreign Application Priority Data

Jun. 3, 2022 (JP) ................................ 2022-091185
Sep. 13, 2022 (JP) ................................ 2022-145072

(51) Int. Cl.
H02M 1/00 (2007.01)
G03G 15/00 (2006.01)

(52) U.S. Cl.
CPC ......... H02M 1/0032 (2021.05); H02M 1/007 (2021.05); G03G 15/80 (2013.01)

(58) Field of Classification Search
CPC ..... H02M 1/0032; H02M 1/007; G03G 15/80
See application file for complete search history.

(56) References Cited

U.S. PATENT DOCUMENTS

| 11,454,911 B2* | 9/2022 | Yoshimura | G03G 15/80 |
| 11,487,235 B2* | 11/2022 | Hirano | G03G 15/5004 |
| 2023/0024417 A1* | 1/2023 | Yamaguchi | H02J 7/00714 |

* cited by examiner

Primary Examiner — Adolf D Berhane
(74) Attorney, Agent, or Firm — Canon U.S.A., Inc. IP Division

(57) ABSTRACT

A power supply apparatus includes a first power supply unit configured to operate in a first mode in which a first DC voltage is generated or in a second mode in which a second DC voltage lower than the first DC voltage is generated. The first power supply unit performs an intermittent oscillation operation when operating in the second mode. The second DC voltage changes within a predetermined range due to the intermittent oscillation operation. A switch is connected between the first and second power supply units and serves to turn on and off the supply of the first or second DC voltage to a load. A controller performs control such that when the first power supply unit is switched from the second mode to the first mode, the switching from the second mode to the first mode is performed after the switch is turned on to the ON state.

22 Claims, 9 Drawing Sheets

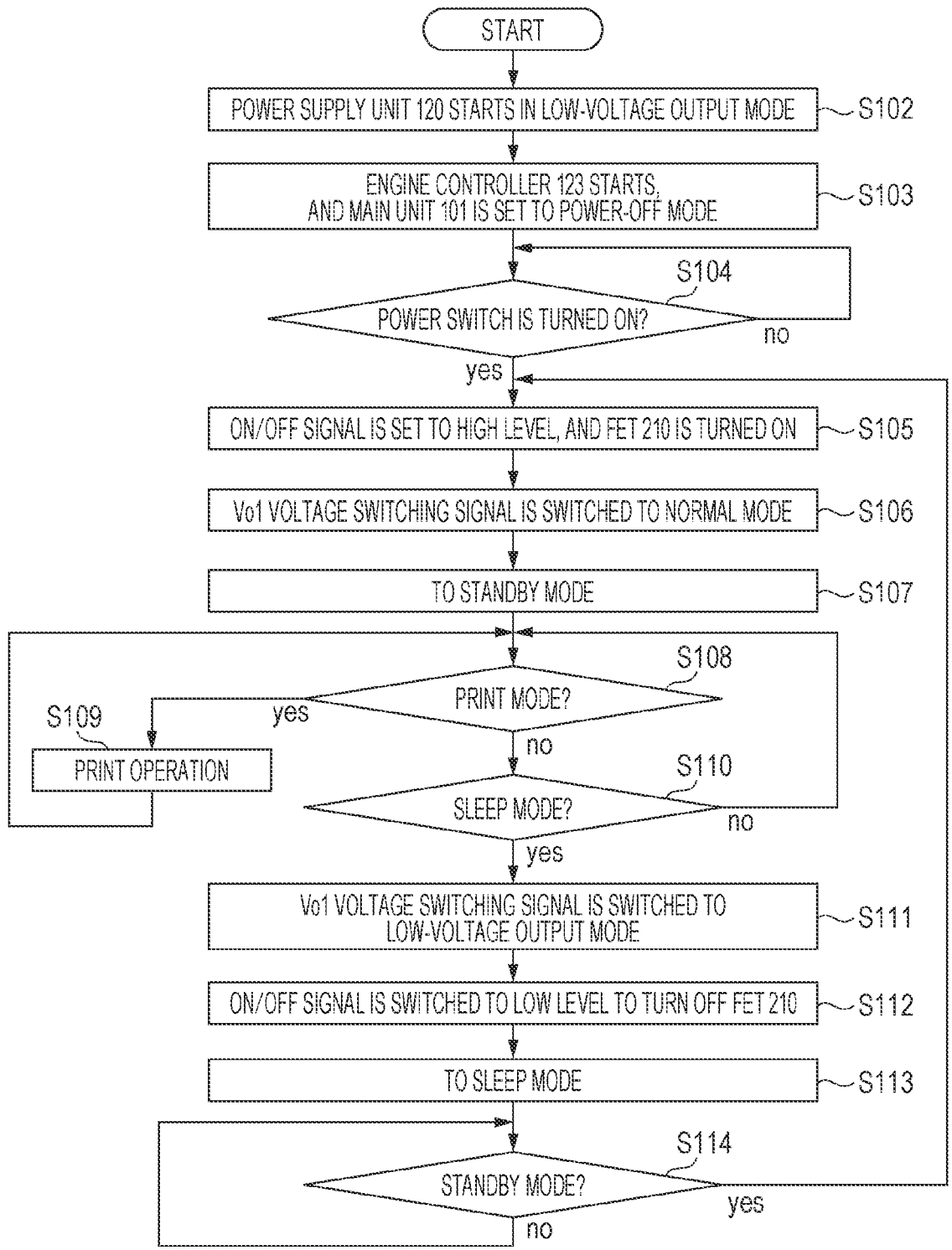

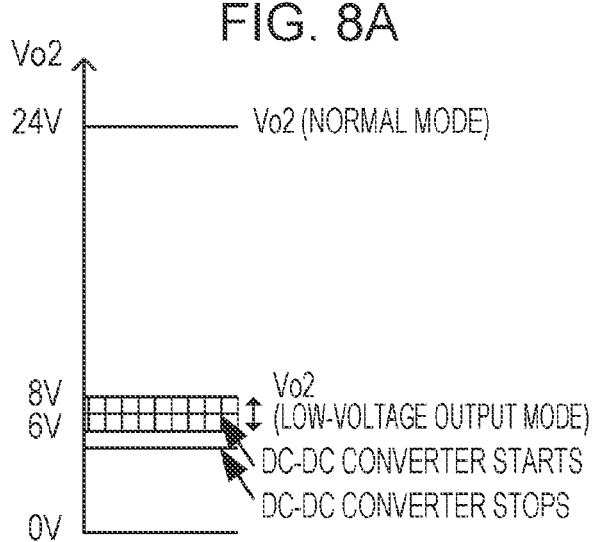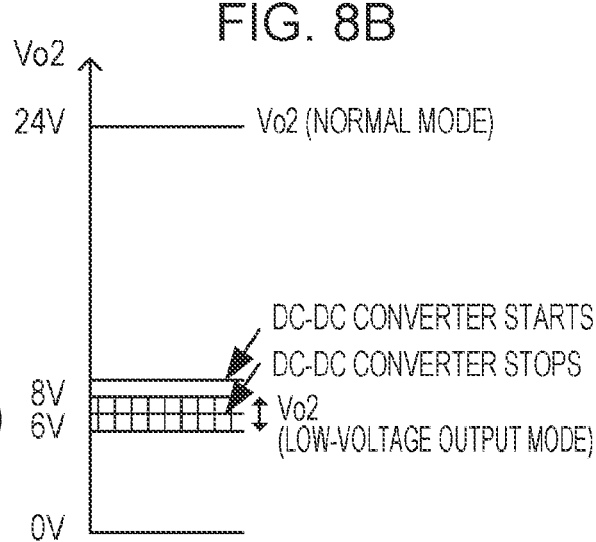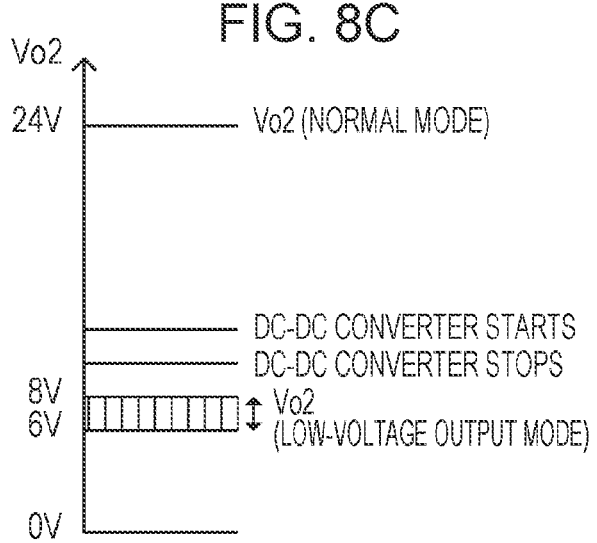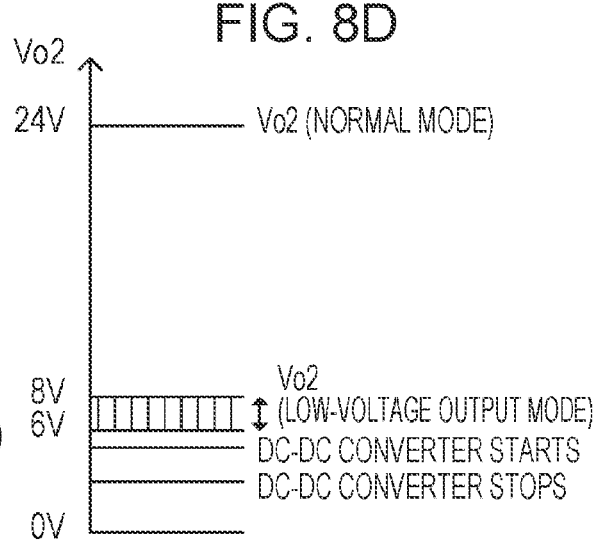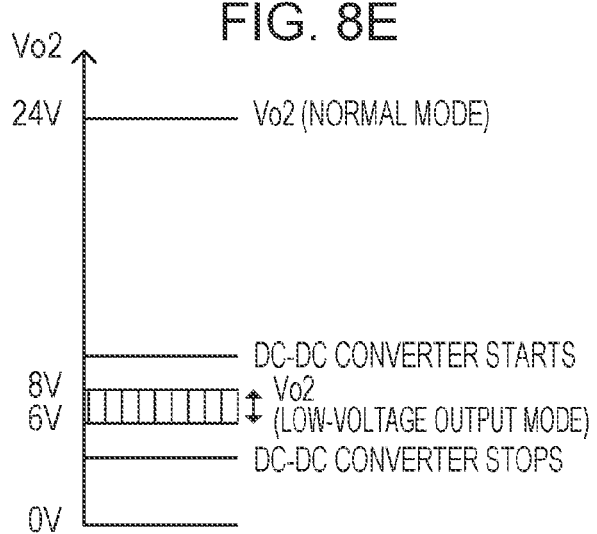

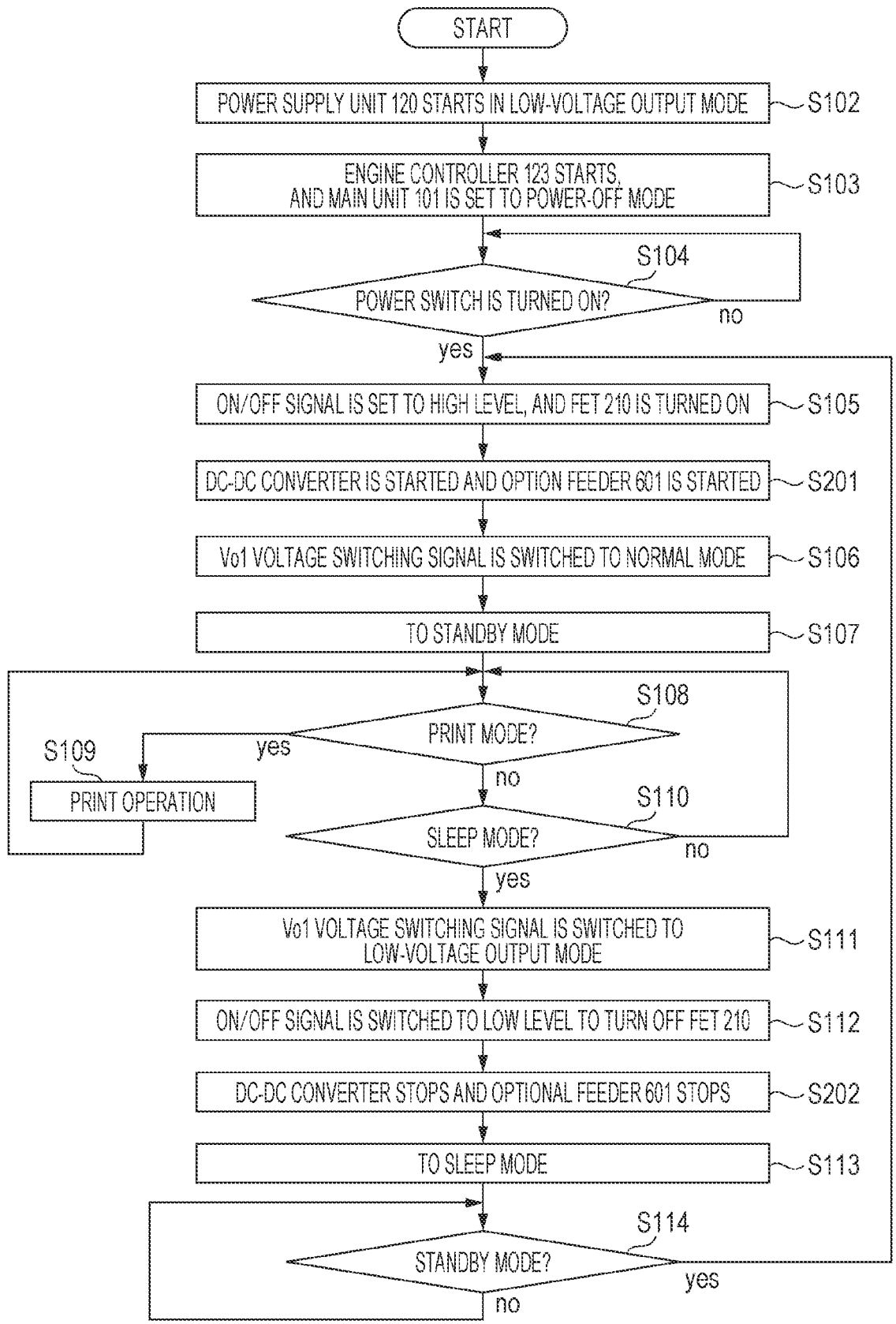

POWER SUPPLY APPARATUS AND IMAGE FORMING APPARATUS

BACKGROUND

Field

The present disclosure relates to a power supply apparatus and an image forming apparatus such as a copier, a facsimile, a printer, etc., and more particularly to a configuration for achieving an inexpensive and simple power supply apparatus.

Description of the Related Art

In recent years, power supply apparatuses installed in image forming apparatuses have come under increasing pressure to save energy and costs. To reduce cost, some power supplies are configured to have a single AC-DC converter capable of switching two or more modes to output two or more voltages, including a high voltage and a low voltage. In such a single-converter configuration, the power supply apparatus has two modes: a mode in which a relatively high voltage, such as 24 V, is output to a drive system unit for printing, image scanning, and/or the like; and a mode in which a relatively low voltage, such as 6 V, is output to achieve low power consumption. A DC-DC converter for operating a control system circuit is further provided at a stage following the AC-DC converter thereby generating a voltage such as 3.3 V from the voltage of 24 V or 6 V described above and supplying it to the control system circuit. The power supply apparatus includes a switching unit configured such that when the power supply apparatus outputs 6 V in a low power consumption mode, the switching unit switches off the supply of a voltage to each drive system unit operating at 24 V to reduce unnecessary power consumption. Each drive system unit is preceded by a capacitor to stabilize the supply voltage.

In the single-converter configuration, when the mode is switched from the low-power mode, in which a low voltage (such as 6 V) is output, to a normal (standby) mode, in which printing and other operations are allowed, a control operation is performed as follows. That is, the output voltage is switched from the low voltage of 6 V to the high voltage of 24 V, and then after the voltage stabilizes, the switching unit is switched from the OFF state to the ON state. In this case, when the switching unit is turned on, a large inrush current flows to the capacitor located in the front stage of each unit. This inrush current can cause malfunctions in peripheral circuits. When a switching unit is configured to have a large current rating to withstand the inrush current, the result is an increase in cost. For example, to handle the situation described above, Japanese Patent No. 5546348 discloses the following technique. In this technique, when the output of the single converter is switched from the low voltage of 3.3 V to the high voltage of 24 V, the switching unit is turned on while keeping the output voltage at 3.3 V, and then the output voltage is switched to 24 V thereby suppressing the inrush current.

However, when the single-converter system operates in the low power consumption mode, an intermittent oscillation operation is performed to reduce the power consumption. In the intermittent oscillation operation, the output voltage repeatedly changes up and down in a predetermined voltage range. In this case, there is a possibility that the threshold voltage of the switching unit falls within the range of the varying voltage, or the start voltage of the DC-DC converter connected to the output of the switching unit falls within the range of the varying voltage, which may cause a repetition of an on/off operation to occur.

SUMMARY

In view of the above, various embodiments of the present disclosure provide a simple and inexpensive technique to prevent a switching unit or a power supply connected to the output of the switching unit from performing a repetitive on/off operation due to an intermittent oscillation operation while suppressing an inrush current into a circuit connected to the output of the power supply apparatus.

In order to achieve improvements, the present disclosure provides the following configurations, among others.

(1) A power supply apparatus including (i) a first generation unit configured to operate in a first mode in which a first DC voltage is generated from an AC voltage or in a second mode in which a second DC voltage lower than the first DC voltage is generated, and (ii) a control unit configured to control changing of the first generation unit from the first mode to the second mode or from the second mode to the first mode. The first generation unit performs an intermittent oscillation operation when the first generation unit is in operation in the second mode and the second DC voltage changes within a predetermined range due to the intermittent oscillation operation. The power supply apparatus further includes a switching unit configured to output, when in an ON state, the first DC voltage or the second DC voltage generated by the first generation unit to a load disposed following the first generation unit, and to turn off, when in an OFF state, the output of the first DC voltage or the second DC voltage to the load, where the switching unit starts to operate when the second DC voltage is outside the predetermined range. The control unit performs control such that when the first generation unit is changed from the second mode to the first mode, the changing from the second mode to the first mode is performed after the switching unit is switched into the ON state.

(2) A power supply apparatus including (i) a first generation unit configured to operate in a first mode in which a first DC voltage is generated from an AC voltage or in a second mode in which a second DC voltage lower than the first DC voltage is generated, (ii) a second generation unit configured to generate a third DC voltage lower than the first DC voltage or the second DC voltage from the first DC voltage or the second DC voltage and output the third DC voltage to a load, and (iii) a control unit configured to control changing of the first generation unit from the first mode to the second mode or from the second mode to the first mode. The first generation unit performs an intermittent oscillation operation when the first generation unit is in operation in the second mode, and the second DC voltage changes within a predetermined range due to the intermittent oscillation operation. The power supply apparatus further includes a switching unit connected between the first generation unit and the second generation unit and configured to output, when in an ON state, the first DC voltage or the second DC voltage generated by the first generation unit to the second generation unit, and to turn off, when in an OFF state, the output of the first DC voltage or the second DC voltage to the second generation unit, where the second generation unit is configured such that a start voltage at which the second generation unit starts operation is within the predetermined range and a stop voltage at which the second generation unit stops operation is lower than the start voltage and outside the predetermined range, or such that the start voltage is outside the predetermined range and the stop voltage is within the predetermined range. The control unit performs control such that when the first generation unit is changed from the second mode to the first mode, the changing from the second mode to the first mode is performed after the switching unit is switched into the ON state.

(3) A power supply apparatus including (i) a first generation unit configured to operate in a first mode in which a first DC voltage is generated from an AC voltage or in a second mode in which a second DC voltage lower than the first DC voltage is generated, (ii) a second generation unit configured to generate a third DC voltage lower than the first DC voltage or the second DC voltage from the first DC voltage or the second DC voltage and output the third DC voltage to a load, and (iii) a control unit configured to control changing of the first generation unit from the first mode to the second mode or from the second mode to the first mode. The first generation unit performs an intermittent oscillation operation when the first generation unit is in operation in the second mode, and the second DC voltage changes within a predetermined range due to the intermittent oscillation operation. The power supply apparatus further includes a switching unit connected between the first generation unit and the second generation unit and configured to output, when in an ON state, the first DC voltage or the second DC voltage generated by the first generation unit to the second generation unit, and to turn off, when in an OFF state, the output of the first DC voltage or the second DC voltage to the second generation unit, where the second generation unit is configured such that a start voltage at which the second generation unit starts operation is outside the predetermined range and a stop voltage at which the second generation unit stops operation is lower than or equal to the start voltage and outside the predetermined range. The control unit performs control such that when the first generation unit is changed from the second mode to the first mode, the changing from the second mode to the first mode is performed after the switching unit is switched into the ON state.

(4) An image forming apparatus including (i) a first generation unit configured to operate in a first mode in which a first DC voltage is generated from an AC voltage or in a second mode in which a second DC voltage lower than the first DC voltage is generated, and (ii) a control unit configured to control changing of the first generation unit from the first mode to the second mode or from the second mode to the first mode. The first generation unit performs an intermittent oscillation operation when the first generation unit is in operation in the second mode, and the second DC voltage changes within a predetermined range due to the intermittent oscillation operation. The image forming apparatus further includes a switching unit configured to output, when in an ON state, the first DC voltage or the second DC voltage generated by the first generation unit to a load disposed following the first generation unit, and to turn off, when in an OFF state, the output of the first DC voltage or the second DC voltage to the load, where the switching unit starts to operate when the second DC voltage is outside the predetermined range. The control unit performs control such that when the first generation unit is changed from the second mode to the first mode, the changing from the second mode to the first mode is performed after the switching unit is switched into the ON state.

(5) An image forming apparatus including (i) a first generation unit configured to operate in a first mode in which a first DC voltage is generated from an AC voltage or in a second mode in which a second DC voltage lower than the first DC voltage is generated, (ii) a second generation unit configured to generate a third DC voltage lower than the first DC voltage or the second DC voltage from the first DC voltage or the second DC voltage and output the third DC voltage to a load, and (iii) a control unit configured to control changing of the first generation unit from the first mode to the second mode or from the second mode to the first mode. The first generation unit performs an intermittent oscillation operation when the first generation unit is in operation in the second mode, and the second DC voltage changes within a predetermined range due to the intermittent oscillation operation. The image forming apparatus further includes a switching unit connected between the first generation unit and the second generation unit and configured to output, when in an ON state, the first DC voltage or the second DC voltage generated by the first generation unit to the second generation unit, and to turn off, when in an OFF state, the output of the first DC voltage or the second DC voltage to the second generation unit, where the second generation unit is configured such that a start voltage at which the second generation unit starts operation is within the predetermined range and a stop voltage at which the second generation unit stops operation is lower than the start voltage and outside the predetermined range, or such that the start voltage is outside the predetermined range and the stop voltage is within the predetermined range. The control unit performs control such that when the first generation unit is changed from the second mode to the first mode, the changing from the second mode to the first mode is performed after the switching unit is switched into the ON state.

(6) An image forming apparatus including (i) a first generation unit configured to operate in a first mode in which a first DC voltage is generated from an AC voltage or in a second mode in which a second DC voltage lower than the first DC voltage is generated, and (ii) a second generation unit configured to generate a third DC voltage lower than the first DC voltage or the second DC voltage from the first DC voltage or the second DC voltage and output the third DC voltage to a load, and (iii) a control unit configured to control changing of the first generation unit from the first mode to the second mode or from the second mode to the first mode. The first generation unit performs an intermittent oscillation operation when the first generation unit is in operation in the second mode, and the second DC voltage changes within a predetermined range due to the intermittent oscillation operation. The image forming apparatus further includes a switching unit connected between the first generation unit and the second generation unit and configured to output, when in an ON state, the first DC voltage or the second DC voltage generated by the first generation unit to the second generation unit, and to turn off, when in an OFF state, the output of the first DC voltage or the second DC voltage to the second generation unit, where the second generation unit is configured such that a start voltage at which the second generation unit starts operation is outside the predetermined range and a stop voltage at which the second generation unit stops operation is lower than or equal to the start voltage and outside the predetermined range. The control unit performs control such that when the first generation unit is changed from the second mode to the first mode, the changing from the second mode to the first mode is performed after the switching unit is switched into the ON state.

Further features of the present disclosure will become apparent from the following description of exemplary embodiments with reference to the attached drawings.

BRIEF DESCRIPTION OF THE DRAWINGS

FIG. 4 is a flowchart illustrating control when a mode changes according to the first embodiment.

FIGS. 8A to 8E are diagrams illustrating relationships among modes, start/stop of a DC-DC converter, and a voltage Vo1 according to the second embodiment.

FIG. 9 is a flowchart illustrating control when a mode changes according to the second embodiment.

DESCRIPTION OF THE EMBODIMENTS

Various embodiments of the present disclosure are described in detail below with reference to embodiments in conjunction with the drawings.

First Embodiment

Image Forming Apparatus

Figure 1:
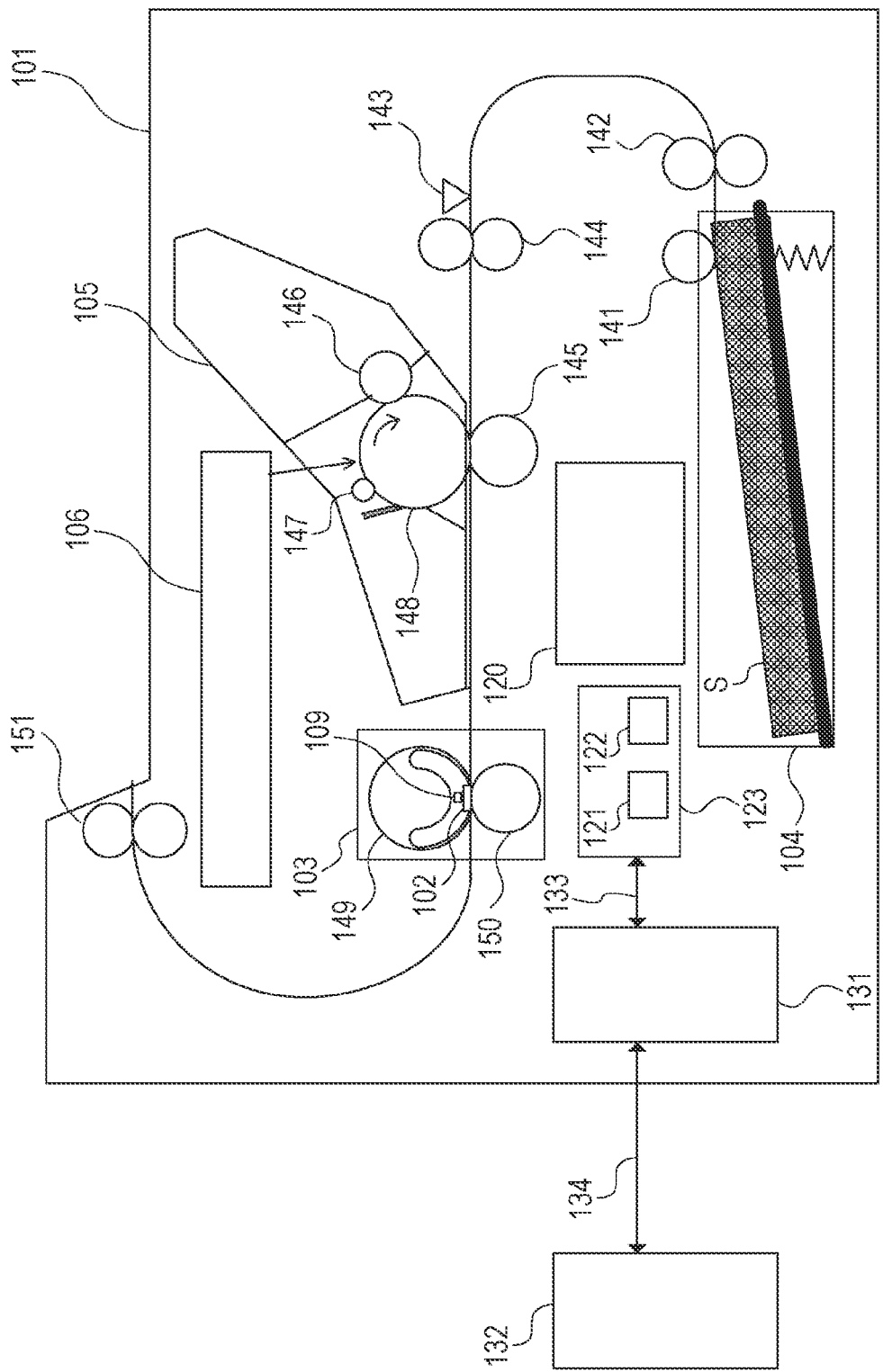
FIG. 1 is a diagram illustrating a configuration of an image forming apparatus according to a first embodiment.

FIG. 1 is a cross-sectional view schematically illustrating a configuration of an image forming apparatus using an electrophotographic process. In the first embodiment, it is assumed by way of example that the image forming apparatus is a laser beam printer, but it may be other types of image forming apparatus such as a copier, a facsimile machine, or an apparatus having functions of the copier, the facsimile machine, and/or the like. In FIG. 1, a main unit 101 of the laser beam printer (hereinafter referred to as the "main unit 101") includes a paper feed cassette 104 configured to store recording sheets S, which are recording media, and a paper feed roller 141 configured to advance the recording sheet S from the paper feed cassette 104, and a conveyance roller pair 142. The main unit 101 includes a top sensor 143 configured to detect the leading edge of the recording sheet S and a registration roller pair 144 configured to synchronously transport the recording sheet S, which are disposed downstream of the transport roller pair 142. The main unit 101 further includes a cartridge unit 105 located downstream of the registration roller pair 144 and configured to form a toner image on the recording sheet S based on laser light supplied from a laser scanner 106. The cartridge unit 105 includes a photosensitive drum 148 serving as an image carrier, a charging roller 147, a developing roller 146, and/or the like which are necessary for a known electrophotographic process. These components, together with the transfer roller 145, serve as image forming means for forming a toner image on the recording sheet S. The main unit 101 has a fixing unit 103 disposed downstream and configured to thermally fix an unfixed toner image formed on the recording sheet S. The fixing unit 103 has a fixing film 149, a pressure roller 150, a heater 102 located inside the fixing film 149, and a thermistor 109 located also inside the fixing film 149 and near the heater 102 to detect the temperature of the heater 102. The main unit 101 includes an ejection roller pair 151 at a downstream location to eject the recording sheet S which has been heat-fixed after the toner image is formed.

The power supply unit 120 supplies voltages to the engine controller 123 (described below), a drive unit (not shown), a high-voltage power supply (not shown), and a drive unit (not shown) of a rotating polyhedral mirror that the laser scanner 106 has. The combination of the drive unit, the high-voltage power supply, and the drive unit of the laser scanner 106 is hereinafter referred to as a drive system unit 130 (see FIG. 2), which includes a plurality of units located at a following stage and serving as a load. The drive unit (not shown) includes a motor, a clutch, etc. The high-voltage power supply (not shown) is used to supply a high voltage to the cartridge unit 105.

The power supply unit 120 serves as a first generation unit configured to operate in a first mode in which a first DC voltage (24 V) is generated from an AC voltage or in a second mode in which a second DC voltage (6 V to 8 V) lower than the first DC voltage is generated. The CPU 122, serving as the control unit, controls the changing of the power supply unit 120 from the first mode to the second mode or from the second mode to the first mode. The power supply unit 120 performs an intermittent oscillation operation when operating in the second mode, and the second DC voltage changes within a predetermined range (for example, 6 V to 8 V) due to the intermittent oscillation operation. The power supply unit 120 is described in further detail later.

The engine controller 123 controls the main unit 101. The engine controller 123 includes the CPU 122 and a DC-DC converter 121. The DC-DC converter 121 serves as a second generation unit configured to generate, from the first DC voltage or the second DC voltage, a third DC voltage (3.3 V) lower than the first DC voltage or the second DC voltage. The DC-DC converter 121 supplies the third DC voltage to the CPU 122. The CPU 122 controls the conveyance of the recording sheet S by controlling the above-described drive unit so as to operate each of the above-described rollers on the conveyance path of the recording sheet S. Along with controlling the conveyance, the CPU 122 controls the laser scanner 106, the cartridge unit 105, the fixing unit 103, and other units to perform an image forming operation (hereinafter also referred to as printing). The DC-DC converter 121 generates, for example, a voltage of 3.3 V as the third DC voltage which is mainly used by a control system circuit, based on the voltage supplied by the power supply unit 120. The voltage of 3.3 V generated by the DC-DC converter 121 is supplied to the circuits in the control system including the CPU 122 and the control circuit (not shown) inside the engine controller 123. The voltage of 3.3 V is also supplied to the control system circuits including a video controller 131 (described below), a laser emitting unit (not shown) of the laser scanner 106, the top sensor 143, and the transport sensor (not shown).

The video controller 131 is connected to the engine controller 123 via an engine interface 133. Furthermore, the video controller 131 is connected to an external apparatus 132 such as a personal computer via wired or wireless communication means or a general-purpose external interface 134 such as USB.

In the power supply unit 120, a zero-crossing timing of an AC power source 201 (see FIG. 2) such as a commercial power source described below is detected, and a resultant zero-crossing detection signal (not shown) is sent to the engine controller 123. Here, the zero-crossing timing refers to the timing when the waveform of the AC voltage output from the AC power supply 201 changes from a predetermined polarity (for example, a positive polarity) to the opposite polarity (for example, a negative polarity), or from the opposite polarity to the predetermined polarity, that is, in other words, the timing when 0 V is crossed. The engine controller 123 controls the switching unit (not shown) to synchronize the power from the AC power supply 201 with the zero-cross timing to obtain a predetermined phase angle or duty ratio of a predetermined wave number, such that the heater 102 has a predetermined temperature.

The video controller 131 receives print information and print data from the external interface 134. The print information includes the type of the recording sheet S (the size, the type of paper such as plain paper, thick paper, glossy paper, etc.), the number of sheets to be printed, and various settings. The video controller 131 internally includes an image control unit (not shown) and converts the print data into image data that can actually be printed. The engine controller 123 then receives the image data from the video controller 131 via the engine interface 133 at a predetermined timing and sends the image data to the laser scanner 106.

The power supply unit 120 is described in further detail. The power supply unit 120 is a switching power supply having a transformer and a switching element, etc. (not shown). This switching element repeatedly turns on and off (switching operation) thereby supplying power to the primary winding of the transformer, and adjusts the voltage appearing on the secondary side of the transformer (the output voltage of the power supply unit 120) by changing the duty ratio of the on/off operation or by changing the frequency. The power supply unit 120 outputs the voltage. Normally, when the load is relatively larger as when a high voltage such as 24 V is output, the on/off operation is performed continuously. When the load is relatively low such as when a low voltage of 6 V to 8 V is output, the on/off operation is stopped for a period of time such that the intermittent oscillation operation is performed. By performing the intermittent oscillation operation, it becomes possible to reduce the number of switching cycles and thus achieve low power consumption although the output voltage changes within a range such as from 6 V to 8 V. In this operation, the larger the voltage change range, the longer the period during which the switching operation is stopped, which is advantageous for the low power consumption.

Operation Mode of Image Forming Apparatus The main unit 101 has four operation modes as shown in Table 1.

TABLE 1

| State of main unit 101 | State of power supply unit 120 | Voltage Vo1 | FET 210 | |
|---|---|---|---|---|
| Print mode | Normal mode | 24 V | ON | Printing operation |
| Standby mode | | | ON | Ready for immediate transition to printing operation |
| Sleep mode | Low-voltage output mode | 6 V to 8 V | OFF | Power saving state |
| Power OFF mode | | | OFF | OFF state |

In Table 1, the first column represents various operation modes of the main unit 101, the second column represents the states of the power supply unit 120 in each mode, the third column represents the voltage Vo1 (V), the fourth column represents the states (ON or OFF state) of the FET 210 described later, and the fifth column represents additional explanations. The first operation mode of the main unit 101 is a print mode in which a print operation is performed, and the second operation mode is a standby mode in which an immediate transition to the print operation is allowed. The third operation mode is a sleep mode (power-saving mode) to reduce the power consumption, and the fourth mode is a power-off (OFF) mode in which the power supply is turned off (to the OFF state). In the sleep mode, the power consumption is reduced to the minimum necessary to receive a print instruction. Therefore, it takes time from the time a print instruction is received to the time a print operation is started.

Regarding the state of the power supply unit 120, the power supply unit 120 operates in the normal mode, which is the first mode described below, when the main unit 101 is in the print mode or the standby mode. When the power supply unit 120 is in the normal mode, the voltage Vo1 is the first DC voltage (for example, 24 V), and the FET 210 is in the ON state. Hereinafter, when the FET 210 is in a conducting state is also expressed as an ON state, and the state in which FET 210 is not conducting (non-conducting state) is also expressed as an OFF state. The power supply unit 120 operates in a low-voltage output mode, which is the second mode described below, when the main unit 101 is in the sleep mode or the power-off mode. When the power supply unit 120 is in the low-voltage output mode, the voltage Vo1 is, for example, 6 V to 8 V given as the second DC voltage, and the FET 210 is in the OFF state. Details thereof are described later.

Circuit Configuration

Figure 2:
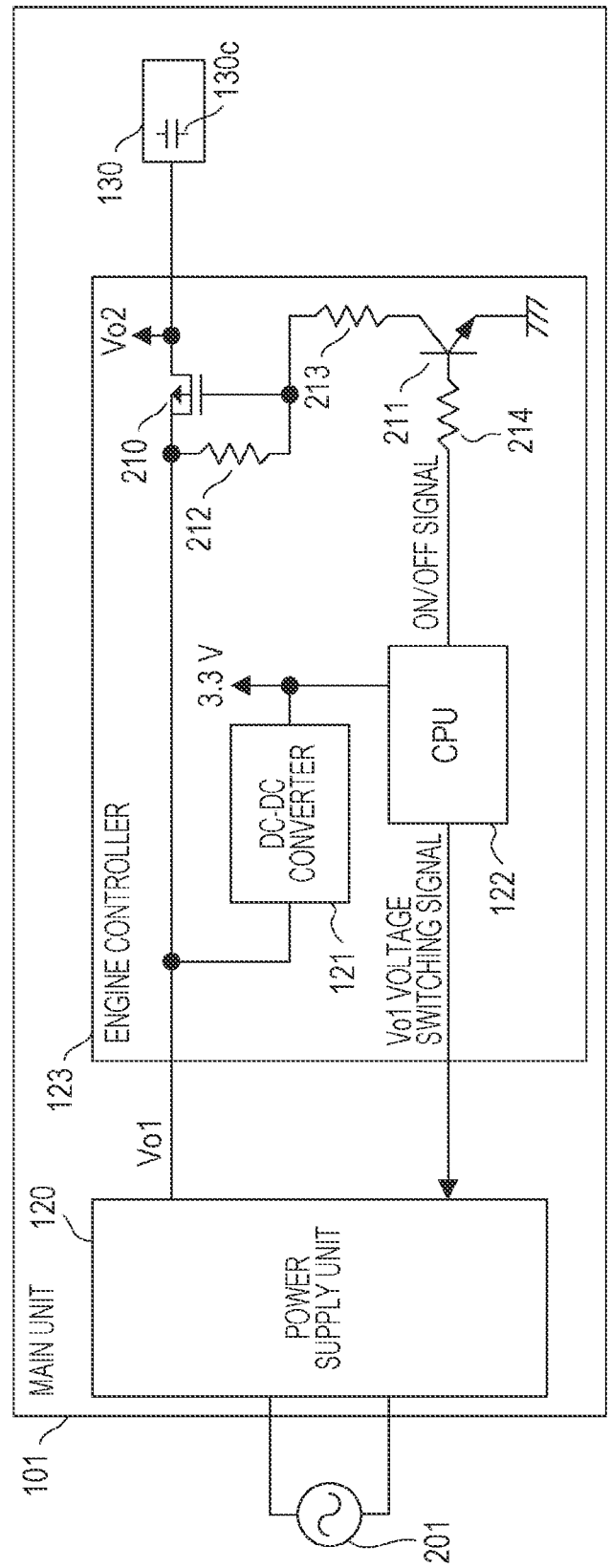
FIG. 2 is a diagram illustrating configurations of a power supply unit and an engine controller according to the first embodiment.

FIG. 2 illustrates a circuit configuration of the main unit 101 including the power supply unit 120 and the engine controller 123 according to the first embodiment. The power supply unit 120 is connected to the AC power supply 201, and generates the voltage Vo1, which is a DC voltage, from the input AC voltage and outputs the resultant voltage Vo1. As shown in Table 1, the power supply unit 120 has two modes depending on the operation mode of the main unit 101. The first mode is the normal mode which is allowed when the main unit 101 is in the print mode or the standby modes. In this normal mode, a relatively high voltage such as 24 V is output as the first DC voltage. The other mode is the low-voltage output mode which is allowed when the main unit 101 is in the sleep mode or the power-off mode. In this low-voltage output mode, a relatively low voltage, i.e., a voltage lower than the first DC voltage is output as the second DC voltage. The mode switching of the power supply unit 120 is performed by the CPU 122 located in the engine controller 123. The CPU 122 sends a Vo1 voltage switching signal to the power supply unit 120 to switch the signal level thereby switching the voltage value of the Vo1. For example, the CPU 122 may switch the power supply unit 120 from the low-voltage output mode to the normal mode by switching the Vo1 voltage switching signal from the low level to the high level, and may switch the power supply unit 120 from the normal mode to the low-voltage output mode by switching the Vo1 voltage switching signal from the high level to the low level. Note that the Vo1 voltage switching signal is output at either the low level or the high level. Note that, alternatively, the CPU 122 may switch the power supply unit 120 from the low-voltage output mode to the normal mode by switching the Vo1 voltage switching signal from the high level to the low level, and may switch the power supply unit 120 from the normal mode to the low-voltage output mode by switching the Vo1 voltage switching signal from the low level to the high level. The first embodiment is characterized in that the low-voltage output mode occurs when the Vo1 voltage switching signal is at the low level.

Intermittent Oscillation Operation in Low-Voltage Output Mode

Figure 3A:
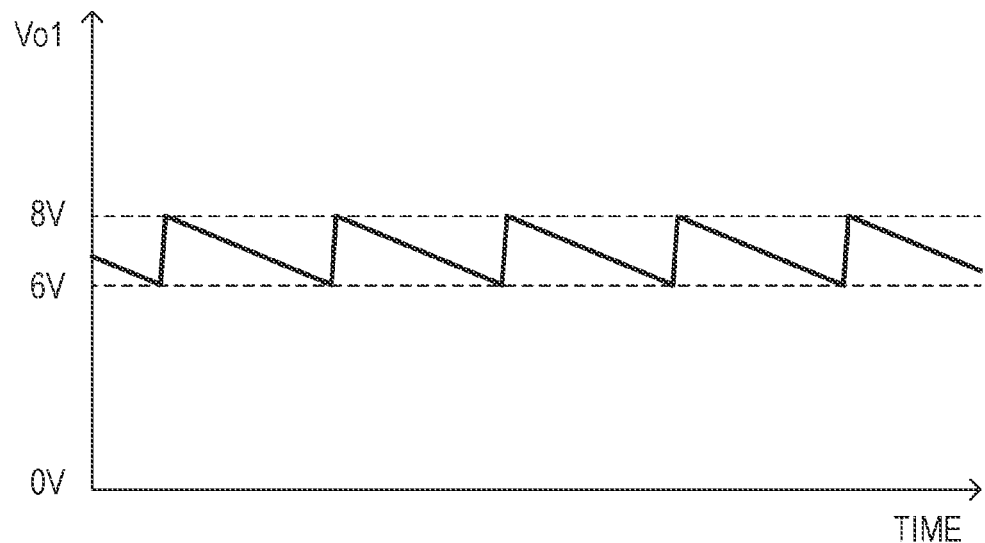
FIG. 3A is a diagram illustrating a voltage change during an intermittent oscillation operation according to the first.

In the low-voltage output mode, the power supply unit 120 performs the intermittent oscillation operation to save power. FIG. 3A illustrates the voltage Vo1 when the power supply unit 120 operates in the low-voltage output mode. In FIG. 3A, the horizontal axis represents time, and the vertical axis represents the voltage Vo1 (V). As shown in FIG. 3A, when the power supply unit 120 operates in the low-voltage output mode, the voltage Vo1 repeatedly changes in the range of, for example, 6 V to 8 V. The intermittent oscillation operation described above makes it possible to reduce the number of switching operations to the necessary minimum, thereby improving the efficiency of the power supply unit 120. That is, the power supply unit 120 can be in the low-voltage output mode to reduce the power consumption of the main unit 101 to a low level.

Referring again to FIG. 2, the voltage Vo1 output from the power supply unit 120 is supplied to the DC-DC converter 121 in the engine controller 123 and also to the field effect transistor (hereinafter referred to as the FET) 210.

The FET 210 serves as the switching unit. When the FET 210 is in the ON state, the FET 210 outputs the voltage Vo1 generated by the power supply unit 120 to the load in the subsequent stage. When the FET 210 is in the OFF state, the FET 210 turns off the supply of the voltage Vo1 to the load.

The DC-DC converter 121 is configured such that the voltage Vo1 output from the power supply unit 120 is input to the DC-DC converter 121, and the DC-DC converter 121 outputs 3.3 V even if the voltage Vo1 changes in the range of 6 V to 24 V. As described above, the voltage of 3.3 V output from the DC-DC converter 121 is supplied to the control system circuits including the CPU 122 and the like in the main unit 101. Note that the closer the input voltage is to the output voltage of 3.3 V, the more efficient the DC/DC converter 121 will be. Therefore, when the power supply unit 120 outputs the voltage changing in the range of 6 V to 8 V in the low-voltage output mode, the higher operation efficiency is obtained than when the power supply unit 120 outputs the voltage of 24 V in the normal mode. That is, when the power supply unit 120 is in the low-voltage output mode, it is possible to reduce the power consumption of the main unit 101 including the power consumption of the DC-DC converter 121.

The FET 210 is a switching element controlled by the CPU 122 to supply/disconnect the voltage Vo1 output from the power supply unit 120 as the voltage Vo2 to the drive system unit 130 in the main unit 101. Resistors 212 and 213 are used to provide the gate voltage to the FET 210. The resistor 213 (one end of the resistor 213) is connected to the resistor 212, and the node between the resistor 212 and the resistor 213 is connected to the gate terminal of the FET 210.

Operation when the ON/OFF Signal is at the High Level

The CPU 122 controls the ON/OFF state of the FET 210 using the ON/OFF signal. When the CPU 122 sets the ON/OFF signal to the high level, the base terminal of the transistor 211 is driven to a high level via the resistor 214, which causes the transistor 211 to turn on. One end of the resistor 214 is connected to the CPU 122 and the other end is connected to the base terminal of the transistor 211. In the transistor 211, the emitter terminal thereof is grounded and the collector terminal thereof is connected to one end of the resistor 213. The other end of the resistor 213 is connected to the resistor 212 as described above.

When the transistor 211 is turned on, the gate voltage of the FET 210 becomes equal to a voltage obtained by dividing the voltage Vo1 by the resistor 212 and the resistor 213. Note that the resistor 212 and the resistor 213 have the same resistance value. Therefore, the voltage at the gate terminal of the FET 210 (hereinafter referred to as the gate terminal voltage) is substantially half the voltage Vo1 (that is, Vo1/2). When the power supply unit 120 outputs a voltage in the low-voltage output mode such that the voltage Vo1 changes within the range of 6 V to 8 V as shown in FIG. 3A, a voltage in the range of 3 V (=6/2 V) to 4 V (=8/2 V) is applied to the gate terminal of the FET 210. In this case, the gate terminal voltage of the FET 210 is −3 V to −4 V with respect to the voltage Vo1, which is the voltage at the source terminal of the FET 210 (hereinafter referred to as the source terminal voltage). The gate threshold voltage of the FET 210 is set to be higher than these voltages, and more specifically, for example, the gate threshold voltage is set to −2.5 V (>−3 V, >−4 V). That is, the gate terminal voltage of the FET 210 with respect to the source terminal voltage of the FET 210 becomes lower than the gate threshold voltage and thus the FET 210 turns on.

As described above, even when the power supply unit 120 is in the low-voltage output mode, the CPU 122 can turn on the FET 210 by setting the ON/OFF signal to the high level. Furthermore, the FET 210 can remain in the ON state even when the voltage Vo1 changes repeatedly in the low-voltage output mode. When the FET 210 turns on, the voltage Vo2 becomes equal to the voltage Vo1 (Vo2=Vo1). As a result, the voltage Vo2, which changes in the range of 6 V to 8 V, is supplied to the drive unit (not shown), the high-voltage power supply (not shown) that supplies a high voltage to the cartridge unit 105, and the drive system unit 130 such as the drive unit (not shown) of the laser scanner 106. In the low-voltage output mode, the drive system unit 130 is stopped by a control signal (not shown) output from the CPU 122.

Each of these drive units 130 has an input capacitor 130*c* in the input stage thereof to stabilize the supplied voltage Vo2. That is, the load in the following stage is operated by the first DC voltage and a capacitor is provided to stabilize the first DC voltage (24 V) input via the FET 210 in the ON state. Note that FIG. 2 does not illustrate an actual connection of the input capacitor 130*c*. There are actually a plurality of input capacitors 130*c*, but only one input capacitor 130*c* is shown in FIG. 2 for simplicity. The presence of the input capacitor 130*c* causes an inrush current to flow from the voltage Vo1 to the voltage Vo2 when the FET 210 is turned on. The magnitude of the inrush current depends on the voltage value of the voltage Vo1 such that the higher the voltage value, the larger the inrush current. Therefore, in the conventional technique, when the FET 210 is turned on when the power supply unit 120 is in the normal mode, a large inrush current occurs. In contrast, in the first embodiment, the FET 210 is turned on when the voltage Vo1 is low compared to 24 V, and thus it is possible to suppress the inrush current to a low level. Thus, the current rating of the FET 210 can be set to a low value, which allows a less expensive FET to be selected as the FET 210.

Operation when the ON/OFF Signal is at Low Level

When the CPU 122 sets the ON/OFF signal to a low level, the transistor 211 is turned off via the resistor 214. As a result, the gate terminal voltage of the FET 210 becomes equal to the voltage Vo1, which is the source terminal voltage of the FET 210, that is, the gate terminal voltage of the FET 210 becomes almost equal to 0 V with respect to the source terminal voltage, which is higher than the gate threshold voltage of −2.5 V.

Therefore, the FET 210 turns off.

In the example shown in Table 1, the FET 210 turns on when the power supply unit 120 is in the low-voltage output mode and the voltage Vo1 changes up and down between 6 V and 8 V, but the present embodiment is not limited to this example. For example, the present embodiment may be configured such that the gate threshold voltage of the FET 210 may be set to −5 V, and the FET 210 is not turned on when the power supply unit 120 is in the low-voltage output mode.

In this case, when the power supply unit 120 is in the low-voltage output mode and the voltage Vo1 changes in the range of 6 V to 8 V, as in the example shown in Table 1, the gate terminal voltage of the FET 210 is in the range of −3 V to −4 V with respect to the source terminal voltage of the FET 210. Therefore, the gate terminal voltage of the FET 210 does not reach the gate threshold voltage of −5 V. Therefore, even when the ON/OFF signal changes to the high level, the FET 210 does not turn ON.

When the power supply unit 120 transitions from the low-voltage output mode to the normal mode with the transistor 211 maintained in the ON state, if the voltage Vo1 reaches 10 V in the initial stage of the voltage transition, then the gate terminal voltage becomes equal to −5 V with respect to the source terminal voltage of the FET 210, which is equal to the voltage Vo1. This allows the gate terminal voltage of the FET 210 to reach the gate threshold voltage, which causes the FET 210 to turn on. Thereafter, the voltage Vo1 reaches 24 V. As described above, the FET 210 can be turned on at a voltage as low as 10 V compared to the voltage Vo1 of 24 V, and thus it is possible to suppress the inrush current compared to the case where the voltage Vo1 is 24 V.

The same effect can also be achieved for a different operating point of the FET 210 by changing the ratio of the resistance values of the resistors 212 and 213 without changing the gate threshold voltage of the FET 210, in other words, without changing the FET 210 to another FET with different characteristics. For example, the resistance ratio of the resistors 212 and 213 may be set to 1:3. In this case, the gate terminal voltage of the FET 210 is −¼ of the voltage Vo1. If the voltage Vo1 changes in the range of voltage of 6 V to 8 V, the gate terminal voltage of the FET 210 changes in the range of −1.5 V (=−6/4 V) to −2 V (=−8/4 V). In a case where the gate threshold voltage of the FET 210 is set to −2.5 V, when the power supply unit 120 operates in the low-voltage output mode, the FET 210 does not turn on, and the gate terminal voltage exceeds the gate threshold voltage of −2.5 V when the voltage Vo1 exceeds 10 V. As described above, by properly selecting the combination of the gate threshold voltage of the FET 210 and the ratio of the resistance values of the resistors 212 and 213, it is possible to control the voltage Vo1 at which the FET 210 turns on/off.

Figure 3B:
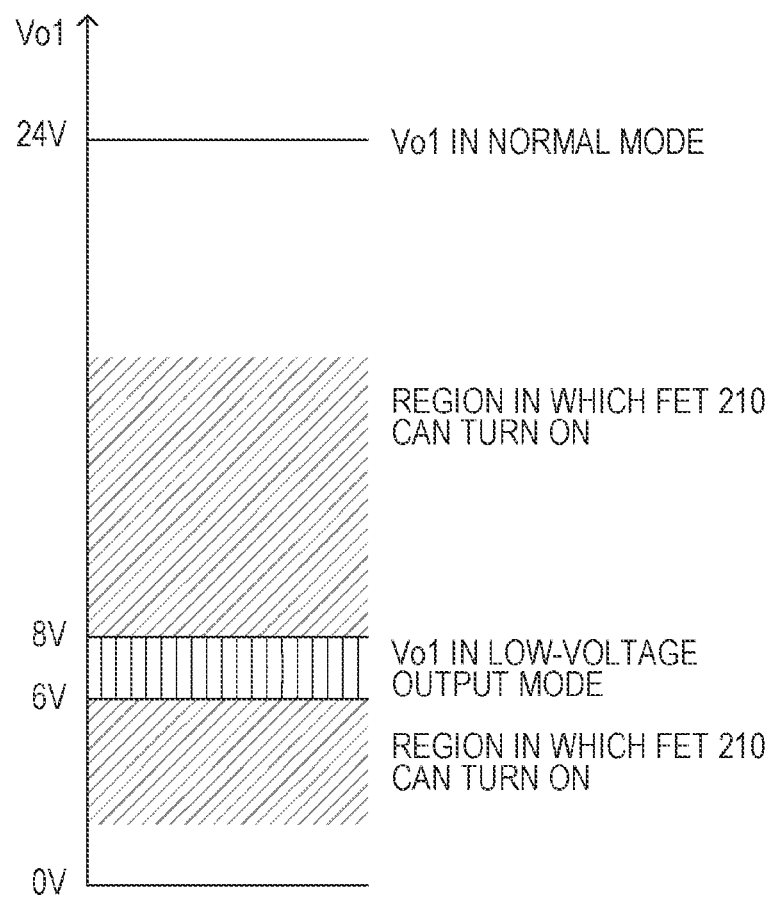
FIG. 3B is a diagram illustrating relationships among modes, ON/OFF states of a FET, and a voltage Vo1.

As described above, it is necessary to set parameters such that the FET 210 does not turn on/off when the voltage Vo1 changes in the specified range when the power supply unit 120 is in the low-voltage output mode. That is, FET 210 starts to operate when the second DC voltage is outside the predetermined range. The ranges of the voltage Vo1 in which the FET 210 can turn on when the power supply unit 120 is in the low-voltage output mode and the ON/OFF signal is set to the high level by the CPU 122 are to be given by the ranges indicated by the area shaded with oblique lines in FIG. 3B. Note that FIG. 3B illustrates the relationships among the value of the voltage Vo1, the mode corresponding to the value of the voltage Vo1, and the state of the FET 210. In FIG. 3B, the solid line represents the voltage Vo1 when the power supply unit 120 is in the normal mode (Vo1=24 V). The varying range of the voltage Vo1 in the low-voltage output mode (6 V≤Vo1≤8 V) is represented by the area hatched with the vertical lines. Furthermore, the area in which the FET 210 can be turned on (the turn-on area) is represented by the area hatched with oblique lines.

The voltage Vo1 at which the FET 210 turns on may be in the range hatched with oblique lines in FIG. 3B, and the FET 210 starts to operate outside the range of 6 V to 8 V (outside the predetermined range). That is, when the power supply unit 120 is in the low-voltage output mode, even if the CPU 122 sets the ON/OFF signal to the high level, the changing voltage Vo1 does not cause the FET 210 to turn on or off. In other words, the FET 210 will not be unstable within this range. To reduce the inrush current from the voltage Vo1 to the voltage Vo2 as much as possible, it may be desirable to configure the FET 210 to turn on at a voltage in a lower region of the area hatched with oblique lines shown in FIG. 3B.

In the first embodiment, the output range of the voltage Vo1 in the low-voltage output mode of the power supply unit 120 has a voltage range of 2 V from 6 V to 8 V, but instead, the voltage range may be greater than 2 V, or conversely, the voltage range may be smaller than 2 V. Depending on the configuration, the voltage range may be smaller than 1 V.

Control of Power Supply Apparatus

The control according to the first embodiment is described with reference to a flowchart shown in FIG. 4. The power supply apparatus may include the power supply unit 120, the CPU 122, the FET 210, and the DC-DC converter 121. When the main unit 101 is connected to the AC power supply 201 and the AC voltage is supplied to the power supply unit 120, a process starting with a step (hereinafter referred to as "S") 102 is started. In S102, the power supply unit 120 starts in the low-voltage output mode. This is because the Vo1 voltage switching signal is at the low level in the CPU 122 in the engine controller 123 that has not started. The power supply unit 120 starts to output the voltage Vo1 in the range of 6 V to 8 V and supplies the voltage Vo1 to the engine controller 123. In the engine controller 123, the DC-DC converter 121 starts to operate and outputs a voltage of 3.3 V, which is supplied to the control system circuits including the CPU 122. When the engine controller 123 starts in S103, the CPU 122 sets the output of the Vo1 voltage switching signal to the low level thereby setting the power supply unit 120 to the low-voltage output mode, and the CPU 122 sets the main unit 101 to the power-off mode.

In S104, the CPU 122 determines whether the power switch (not shown) of the main unit 101 is turned on. In a case where the CPU 122 determines in S104 that the power switch is not turned on, the process returns to S104. In a case where it is determined that the power switch is turned on, the process proceeds to S105. That is, the CPU 122 continues the power-off mode while monitoring the state of the power switch.

When the power switch is pressed, the CPU 122 sets the ON/OFF signal in S105 to the high level thereby turning on the FET 210. As a result, a voltage in the range of 6 V to 8 V is supplied to the voltage Vo2, which causes the input capacitor 130c located at the input of the drive system unit 130 to be charged. In S106, the CPU 122 switches the Vo1 voltage switching signal to set the power supply unit 120 to the normal mode. This causes the power supply unit 120 to switch from the low-voltage output mode, in which the voltage in the range of 6 V to 8 V is output as the voltage Vo1, to the normal mode, in which 24 V is output. By performing the control as described above, it is possible to suppress the inrush current that occurs when the FET 210 turns on.

In S107, the main unit 101 goes into the standby mode and becomes ready to immediately start a print operation. As a result, the main unit 101 enters a state of waiting for a print instruction. In S108, the CPU 122 determines whether to enter a print mode in response to receiving a print instruction. In a case where it is determined not to enter the print mode, the process proceeds to S110. When the CPU 122 receives a print instruction in S108, the CPU 122 determines to enter the print mode, and the process proceeds to S109. In S109, the CPU 122 performs the print operation and then returns the process to S108.

In S110, the CPU 122 determines whether to enter a sleep mode. In a case where it is determined in S110 not to enter the sleep mode, the process returns to S108. In a case where it is determined to enter the sleep mode, the process proceeds to S111. For example, when a predetermined amount of time has elapsed while waiting for a print instruction, or when a user performs an operation to enter the sleep mode, the CPU 122 starts the process of entering the sleep mode. In S111, the CPU 122 switches the Vo1 voltage switching signal to cause the power supply unit 120 to enter the low-voltage output mode. In S112, the CPU 122 switches the ON/OFF signal to the low level to turn off the FET 210. In S113, the CPU 122 causes the main unit 101 to enter the sleep mode.

In S114, the CPU 122 determines whether to enter the standby mode. In a case where it is determined not to enter the standby mode, the process returns to S114 to continue the sleep mode. In S114, if a print instruction is received or a user issues an instruction to enter the standby mode, the CPU 122 determines to enter the standby mode. In this case, the process returns to S105 to enter the standby mode (S105 to S107).

As described above, when the power supply 120 is to be switched from the low-voltage output mode to the normal mode, the CPU 122 turns on the FET 210 and then controls the power supply 120 to switch from the low-voltage output mode to the normal mode. On the other hand, when the power supply unit 120 is to be switched from the normal mode to the low-voltage output mode, the CPU 122 performs control such that the power supply unit 120 is first switched from the normal mode to the low-voltage output mode and then the FET 210 is turned off. Alternatively, when the mode is to be switched from the normal mode to the low-voltage output mode, the FET 210 may be turned off first, and then the switching to the low-voltage output mode may be performed.

As described above, in the first embodiment, when the power supply unit 120 is in the low-voltage output mode, the inrush current flowing from the voltage Vo1 to the voltage Vo2 can be suppressed by first turning on the FET 210 and then performing switching to the normal mode. This allows it to reduce the current capacity of the elements used in the switching unit. The FET 210 can operate stably without being turned on or off by the change in the voltage Vo1 in the low-voltage output mode.

In the first embodiment and also in the following embodiments, the FET 210 is used as the switching unit, but this is only by way of example and not limitation. It is sufficient if the switching unit is configured such that in its ON state the switching unit provides the voltage Vo1 output from the power supply unit 120 to the drive system unit 130, and in its OFF state the switching unit turns off the supply of the voltage Vo1 to the drive system unit 130. The switching unit is controlled by the CPU 122 to be turned on and off. For example, the switching unit may be a transistor, a relay, a mechanical switch, or the like.

According to the first embodiment, as described above, it is possible, by a simple and inexpensive means, to prevent the switching unit or the power supply connected to the output of the switching unit from being repeatedly turned on and off due to a voltage change caused by the intermittent oscillation operation while reducing the inrush current into the circuit connected to the output of the power supply apparatus.

Second Embodiment

In the first embodiment described above, the technique has been disclosed to configure the main unit 101, the power supply unit 120, and the engine controller 123 to suppress the inrush current. A second embodiment described below discloses a configuration that suppresses an inrush current that may occur when an optional feeder is connected to the main unit 101, and reduces a start time of the optional feeder when the power is turned on or when the mode is switched from the sleep mode to the standby mode. The second embodiment is described below by way of example for a case in which a DC-DC converter is connected to the output of the FET 210 serving as the switching unit. When a similar configuration is made according to conventional techniques, the start voltage or the stop voltage at which the DC-DC converter starts or stops may fall within the range of the voltage change caused by the intermittent oscillation operation of the power supply unit 120 serving as the first generation unit, which may cause the DC-DC converter to repeatedly start and stop against the intention. Hereinafter, the voltage at which the DC-DC converter starts is referred to as the start voltage and the voltage at which it stops is referred to as the stop voltage. The second embodiment discloses a configuration that allows stable operation even with such a DC-DC converter. The main elements of the configuration and the operation thereof are as described in the first embodiment, and the same reference numbers are used for such elements and a duplicate description thereof is omitted.

Image Forming Apparatus

Figure 5:
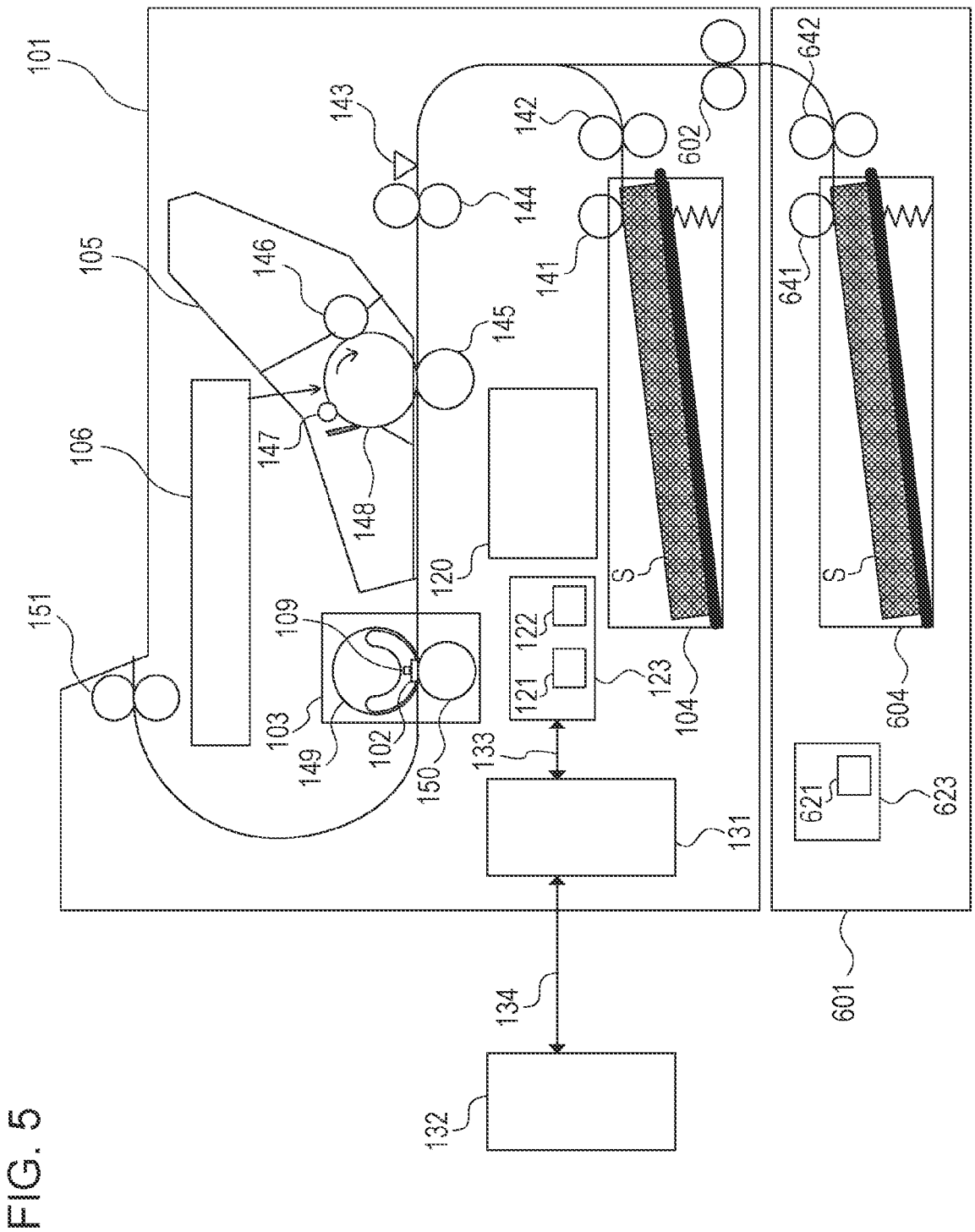
FIG. 5 is a diagram illustrating a configuration of an image forming apparatus according to a second embodiment.

As shown in FIG. 5, an optional feeder 601 is disposed below the main unit 101. Like the main unit 101, the optional feeder 601 has a paper feed cassette 604. The optional feeder 601 includes a paper feed roller 641 configured to feed out a recording sheet S from the paper feed cassette 604, a conveyance roller pair 642, and a conveyance roller pair 602, which is located downstream of the conveyance roller pair 642 and on the side of the main unit 101, configured to convey the recording sheet S received from the optional feeder 601.

The optional controller 623 is a controller configured to control the optional feeder 601. The optional controller 623 communicates with the engine controller 123 via a communication line (not shown). The optional controller 623 controls the conveyance of the recording sheet S by controlling the drive unit (not shown) in the optional feeder 601 while communicating to operate the paper feed roller 641 and the conveyance roller pair 642. The optional controller 623 includes a DC-DC converter 621, described below. The DC-DC converter 621 serves as a second generation unit configured to be supplied with the first DC voltage or the second DC voltage via the FET 210 and to generate a third DC voltage lower than the first DC voltage or the second DC voltage. The optional controller 623, like the engine controller 123, includes a CPU (not shown) and other components.

Circuit Configuration

Figure 6:
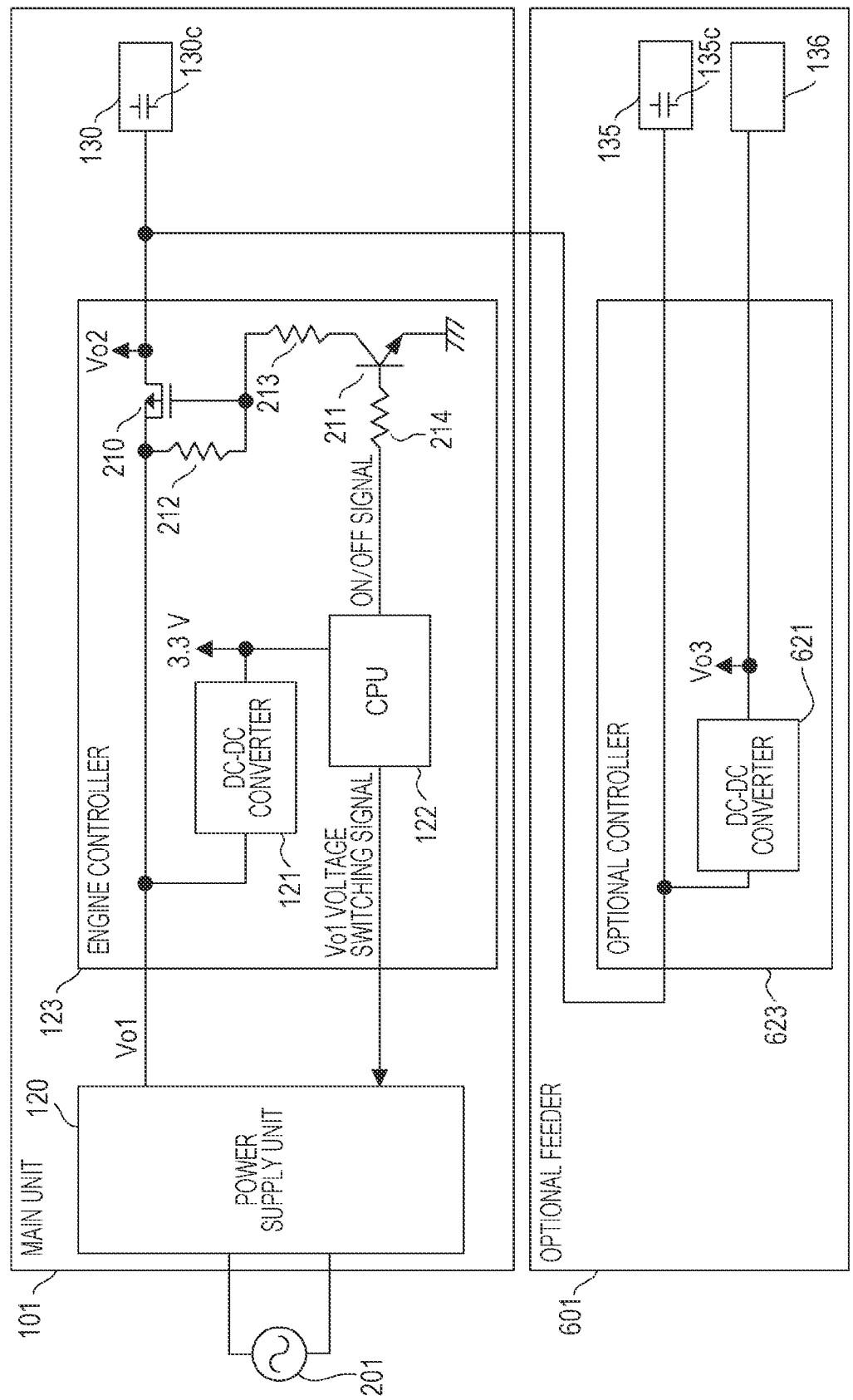
FIG. 6 is a diagram illustrating configurations of a power supply unit, an engine controller, and an optional controller according to the second embodiment.

FIG. 6 shows a circuit configuration of the main unit 101 including the power supply unit 120 and engine controller 123, and a circuit configuration of the optional feeder 601 including the optional controller 623, according to the second embodiment. The voltage Vo2 output from the engine controller 123 is supplied to the drive system unit 130 of the main unit 101 and also to the optional feeder 601. In the optional feeder 601, the voltage Vo2 is supplied to the drive system unit 135 and also to the optional controller 623 and the DC-DC converter 621 in the optional controller 623. The drive system unit 135 in the optional feeder 601 has an input capacitor 135c located at the input of the optional feeder 601 to stabilize the supply voltage. That is, the load is operated by the first DC voltage (24 V) and the capacitor is provided to stabilize the first DC voltage input via the FET 210 in the ON state. Note that FIG. 6 does not show an actual connection of the input capacitor 135c. There are actually a plurality of input capacitors 135c, but only one input capacitor 135c is shown in FIG. 6 for simplicity. The DC-DC converter 621 generates a voltage of Vo3 equal to, for example, 3.3 V as a third DC voltage based on the voltage Vo2 and supplies it to the control system circuit 136 such as a CPU and a sensor (not shown) in the optional feeder 601.

Figure 7A:
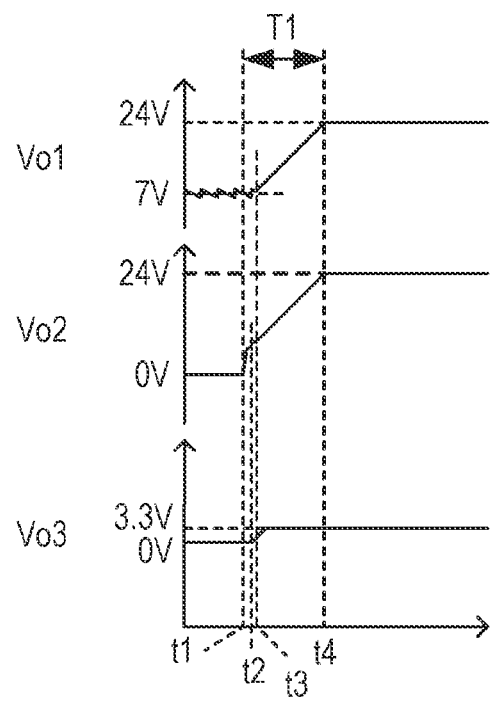
FIG. 7A is a diagram illustrating voltage waveforms according to the second embodiment.
Figure 7B:
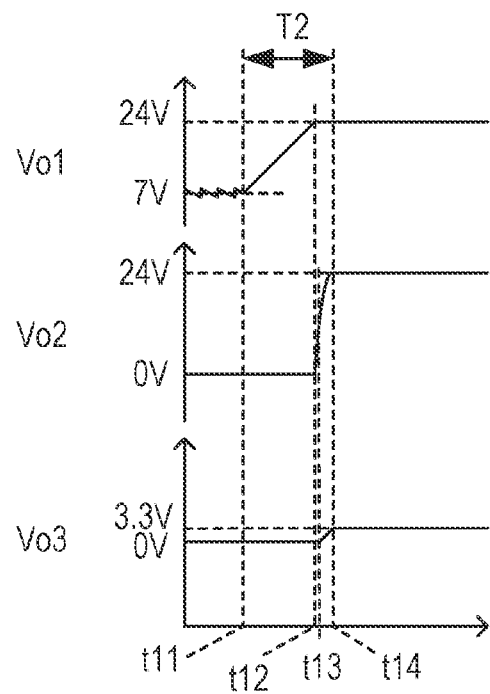
FIG. 7B is a diagram illustrating voltage waveforms in a comparative example.

The start voltage of the DC-DC converter 621 is set to be higher than its stop voltage. For example, the DC-DC converter 621 has a hysteresis characteristic that causes the DC-DC converter 621 to start when the input voltage Vo2 is 7 V and to stop when the input voltage Vo2 is 5 V. FIGS. 7A and 7B illustrate various voltages as a function of time. In each of FIGS. 7A and 7B, the horizontal axis represents time, and the vertical axis represents a voltage (V). Note that the voltage Vo1, the voltage Vo2, and the voltage Vo3 are all plotted in each of the figures such that the voltage Vo1 and the voltage Vo2 are shifted in the vertical direction such that they do not overlap. As shown in FIG. 7A, when the FET 210 turns on at time t1 when the power supply unit 120 is in the low-voltage output mode, the same voltage as the Vo1 which repeatedly changes in the range of 6 V to 8 V appears as the voltage Vo2. Since the start voltage of the DC-DC converter 621 is 7 V, the DC-DC converter 621 starts (at time t2) when the voltage Vo2 reaches 7 V even when the power supply unit 120 is in the low-voltage output mode.

On the other hand, since the stop voltage of the DC-DC converter 621 is 5 V, the DC-DC converter 621 continues to operate without stopping when the power supply unit 120 is operating in the low-voltage output mode and the FET 210 is in the ON state. When the DC-DC converter 621 starts, the voltage 3.3 V is supplied to the control system circuit 136 in the optional feeder 601 connected to the voltage Vo3, and thus the optional controller 623 starts. As a result, the CPU (not shown) in the optional controller 623 becomes possible to start to communicate with the CPU 122.

As described above, the inrush current can be suppressed by turning on the FET 210 when the power supply unit 120 is operating in the low-voltage output mode. The DC-DC converter 621 can be started (at time t2) before the voltage Vo1 reaches 24 V after the mode is switched at time t3 from the low-voltage output mode to the normal mode, that is, before the voltage Vo2 reaches 24 V at time t4. Therefore, it becomes possible to start the control system circuit 136 in the optional feeder 601 more quickly, which makes it possible to be ready for a print operation in the standby mode when the voltage Vo2 reaches 24 V. In the first embodiment, as shown in FIG. 7A, the start time T1 is given by a period from time t1 to time t4.

On the other hand, in the conventional example shown in FIG. 7B, the voltage Vo1 of the power supply unit 120 is switched from the low-voltage output mode to the normal mode at time tn. At time t12, 24 V is output and the FET 210 is turned on. At time t13, the DC-DC converter 621 starts. Thus, an inrush current flows through the FET 210 and a delay occurs in the timing t14 of supplying 3.3 V to the control system circuit 136 of the optional feeder 601.

In the conventional example, the start time T2 is given by a period from time t11 to time t14. Note that it takes some time for printing to become possible after 3.3 V is supplied to the control system circuit 136. This is because it takes time to start the control system circuit 136. More precisely, time t14 is not the time when the optional feeder 601 starts (and the printing becomes possible) but refers to the start time of the DC-DC converter 621. Therefore, the start time of the optional feeder 601 is later than the time t14.

Therefore, the time at which the main unit 101 and the optional feeder 601 return from the sleep mode to the standby mode is slightly delayed compared to the time T2 in the conventional example ((actual start time in the conventional example)>T2>T1). As described above, the start time T2 is not the time to return from the sleep mode to the standby mode. The start time T1 is the time to return from the sleep mode to the standby mode. After the 3.3 V is supplied to the control circuit 136, the voltage of the control circuit 136 rises to 24 V in some time, and it becomes possible to perform printing when the voltage of the control circuit 136 reaches 24 V.

As described above, when the power supply unit 120 operates in the low-voltage output mode, the FET 210 is turned on and the voltage Vo2 changing in the range of 6 V to 8 V is supplied to the DC-DC converter 621, the following settings are required. That is, it is necessary to make setting such that the DC-DC converter 621 does not repeatedly start and stop. More specifically, it is necessary that the start voltage and the stop voltage of the DC-DC converter 621 do not both fall within the changing range of the voltage Vo2. More specifically, the voltage relationships should satisfy one of the five patterns shown in FIG. 8A to FIG. 8E. FIGS. 8A to 8E each are a diagram similar to FIG. 3B according to the first embodiment. FIGS. 8A to 8E each show, in addition to the normal mode voltage Vo2 of 24 V, the low-voltage output mode voltage Vo2 in the range of 6 V to 8 V (hatched with vertical lines).

First Pattern

FIG. 8A shows a first pattern in which the start voltage of the DC-DC converter 621 is within the range of the voltage Vo2 in the low-voltage output mode of the power supply unit 120, and the stop voltage is lower than the range of the voltage Vo2. In this case, as described above, the DC-DC converter 621 starts when the FET 210 turns on in the low-voltage output mode and the voltage Vo2 exceeds the start voltage of the DC-DC converter 621. The DC-DC converter 621 stops when the power supply unit 120 is switched from the normal mode to the low-voltage output mode and then the FET 210 turns off and the voltage Vo2 drops down to 0 V. As described above, the DC-DC converter 621 is set such that the DC-DC converter 621 can start to operate while the voltage Vo1 (Vo2) is at the second DC voltage (6 V to 8 V) and can stop when the voltage Vo1 is lower than the second DC voltage.

Second Pattern

FIG. 8B shows a second pattern in which the start voltage of the DC-DC converter 621 is higher than the range of the voltage Vo2 in the low-voltage output mode of the power supply unit 120, and the stop voltage is within the range of the voltage Vo2. In this case, the DC-DC converter 621 does not start in the range of the voltage Vo2 in the low-voltage output mode. However, the DC-DC converter 621 starts during the transition of the power supply unit 120 from the low-voltage output mode to the normal mode. The DC-DC converter 621 stops when the power supply unit 120 is switched from the normal mode to the low-voltage output mode and the voltage Vo2 drops below the stop voltage of the DC-DC converter 621. After that, the DC-DC converter 621 will never restart in the low-voltage output mode. As described above, the DC-DC converter 621 is set such that the DC-DC converter 621 can start while the voltage Vo1 (Vo2) increases toward the first DC voltage (24 V), and such that the DC-DC converter 621 can stop while operating with the second DC voltage (6 V to 8 V).

Third Pattern

FIG. 8C shows a third pattern in which both the start and stop voltages of the DC-DC converter 621 are higher than the range of the voltage Vo2 in the low-voltage output mode. In this case, as in the second pattern shown in FIG. 8B, the DC-DC converter 621 neither starts nor stops in the range of the voltage Vo2 in the low-voltage output mode. The DC-DC converter 621 starts during the transition of the power supply unit 120 from the low-voltage output mode to the normal mode. The DC-DC converter 621 stops while the power supply unit 120 is in the transition from the normal mode to the low-voltage output mode. As described above, the DC-DC converter 621 is set such that the DC-DC converter 621 can start while the voltage Vo1 (Vo2) increases toward the first DC voltage (24 V), and the DC-DC converter 621 is set to be able to stop while the voltage Vo2 decreases towards the second DC voltage (6 V to 8 V).

Fourth Pattern

FIG. 8D shows a fourth pattern in which both the start and stop voltages of the DC-DC converter 621 are lower than the range of the voltage Vo2 in the low-voltage output mode. In this case, the DC-DC converter 621 starts when the FET 210 turns on in the low-voltage output mode. The DC-DC converter 621 stops when the power supply unit 120 is switched from the normal mode to the low-voltage output mode and then the FET 210 turns off and the voltage Vo2 drops down to 0 V. As described above, the DC-DC converter 621 is set such that the DC-DC converter 621 can start while the voltage Vo1 (Vo2) increases toward the second DC voltage (6 V to 8 V), and the DC-DC converter 621 can stop while the voltage Vo1 decreases from the second DC voltage.

Fifth Pattern

FIG. 8E shows a fifth pattern in which the start voltage of the DC-DC converter 621 is higher than the range of the voltage Vo2 in the low-voltage output mode, and the stop voltage is lower than the range of the voltage Vo2. As in the second and third patterns shown in FIGS. 8B and 8C, the DC-DC converter 621 does not start in the range of the voltage Vo2 in the low-voltage output mode. The DC-DC converter 621 starts during the transition of the power supply unit 120 from the low-voltage output mode to the normal mode. The DC-DC converter 621 stops when the power supply unit 120 is switched from the normal mode to the low-voltage output mode and then the FET 210 turns off and the voltage Vo2 drops down to 0 V. As described above, the DC-DC converter 621 is set such that the DC-DC converter 621 can start while the voltage Vo1 (Vo2) increases toward the first DC voltage (24 V), and the DC-DC converter 621 can stop while the voltage Vo1 decreases from the second DC voltage (6 V to 8 V).

As described above, it is necessary to properly set the relationship between the start voltage and the stop voltage of the DC-DC converter 621 and the voltage range of the voltage Vo2 in the low-voltage output mode of the power supply unit 120. This setting prevents the DC-DC converter 621 from repeating unstable start/stop operation when the FET 210 is turned on when the power supply unit 120 is in the low-voltage output mode. To make it possible for the optional controller 623 to start more quickly, the start voltage of the DC-DC converter 621 may be set further lower, for example, as shown in FIG. 8A or FIG. 8D. In the example described above, the DC-DC converter 621 has a hysteresis characteristic that causes the DC-DC converter 621 to start at the voltage Vo2 of 7 V and to stop at 5 V, but this is only by way of example and not limitation. The DC-DC converter may not have a hysteresis characteristic. In the case where the DC-DC converter does not have a hysteresis characteristic and the start voltage and the stop voltage of the DC-DC converter are the same, the settings may be made such that the DC-DC converter starts and stops outside the range of the second DC voltage (6 V to 8 V). Furthermore, the output range of the voltage Vo1 in the low-voltage output mode of the power supply unit 120 in the second embodiment has a value of 2 V from 6 V to 8 V, but this is only by way of example and not limitation. The magnitude of the range may be greater than 2 V or, conversely, smaller than 2 V. Depending on the configuration, the voltage range may be smaller than 1 V. In this case, the start/stop voltage of the DC-DC converter 621 may be set to be different from the voltage Vo1 in the low-voltage output mode.

Control of Power Supply Apparatus

Next, referring to FIG. 9, the control according to the second embodiment is described. The power supply apparatus may include the power supply unit 120, the CPU 122, the FET 210, the DC-DC converter 121, and the DC-DC converter 621. The same steps as those in the first embodiment are denoted by the same step numbers, and duplicate descriptions thereof are omitted. When the CPU 122 sets the ON/OFF signal output to the high level thereby turning on the FET 210 in S105, a voltage in the range 6 V to 8 V is supplied to the voltage Vo2, and the voltage Vo2 is supplied to the optional feeder 601. As a result, the voltage Vo2 is supplied to the DC-DC converter 621 of the optional controller 623, and the DC-DC converter 621 starts in S201. As a result, 3.3 V is output as the voltage Vo3. Furthermore, the optional feeder 601 starts and is ready to perform printing. In S106, the CPU 122 switches the Vo1 voltage switching signal to switch the power supply unit 120 from the low-voltage output mode to the normal mode.

In a case where it is determined in S110 to enter the sleep mode, the CPU 122 switches the Vo1 voltage switching signal in S111 to switch the power supply unit 120 from the normal mode to the low-voltage output mode. In S112, the CPU 122 switches the ON/OFF signal to the low level thereby turning off the FET 210. As a result, the DC-DC converter 621 and the optional feeder 601 stop in S202. The main unit 101 then enters the sleep mode in S113.

As described above, in the second embodiment, the voltage Vo1 of the power supply unit 120 is switched after the FET 210 is turned on. This suppresses the inrush current flowing through FET 210 and reduces the start time when the main unit 101 including the optional feeder 601 is turned on and the transition time from the sleep mode to the standby mode. In the second embodiment, the optional feeder 601 is provided on the main unit 101 as an optional apparatus, but this is merely by way of example and not limitation. If the optional apparatus is configured to include a DC-DC converter that operates with an input voltage Vo2, the control according to the second embodiment can be applied. For example, the optional apparatus may be a post-processing apparatus or the like connected to the main unit 101. In the first embodiment and the second embodiment, the controller (the engine controller 123, the optional controller 623) is configured to include a DC-DC converter, but this is merely by way of example and not limitation. For example, a separate DC-DC converter may be provided to supply a voltage to the control system circuits.

In the second embodiment, the start voltage at which the DC-DC converter 621 serving as the second generation unit according to the present embodiment starts is set within a predetermined voltage range or the stop voltage at which the DC-DC converter 621 stops is set to be lower than the start voltage and within a predetermined voltage range, as shown in FIG. 8A or FIG. 8B. Alternatively, the start voltage at which the DC-DC converter 621 starts is set outside a predetermined voltage range, and the stop voltage at which the DC-DC converter 621 stops is set to be lower than the start voltage and outside a predetermined voltage range. This setting corresponds to FIG. 8C, 8D, or 8E, or corresponds to a case where the start voltage and the stop voltage are equal, that is, DC-DC converter 621 has no hysteresis characteristic.

According to the second embodiment, as described above, it is possible, by simple and inexpensive means, to prevent the switching unit or the power supply connected to the output of the switching unit from being repeatedly turned on and off due to a voltage change caused by the intermittent oscillation operation while reducing the inrush current into the circuit connected to the output of the power supply apparatus.

In the first embodiment and the second embodiment described above, the voltage of 3.3 V generated by the DC-DC converter 121 is supplied to the CPU 122, but this is only by way of example and not limitation. For example, a power supply unit may be provided separately from the power supply unit 120 and this power supply unit may generate 3.3 V directly from AC voltage and supply the resultant the voltage of 3.3 V to the CPU 122, or 3.3 V may be supplied from an external unit. Other voltages or other voltage generation methods may be used as long as the CPU 122 can operate properly. The voltage of 3.3 V generated by the DC-DC converter 121 may be supplied to other elements in the control system circuitry, such as the laser emitting unit of the laser scanner 106 and/or the like.

According to various embodiments of the present disclosure, it is possible by simple and inexpensive means to prevent the switching unit or the power supply connected to the output of the switching unit from being repeatedly turned on and off due to a voltage change caused by the intermittent oscillation operation while reducing the inrush current into the circuit connected to the output of the power supply apparatus.

While exemplary embodiments have been described in the present disclosure, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-091185 filed Jun. 3, 2022 and No. 2022-145072 filed Sep. 13, 2022, which are hereby incorporated by reference herein in their entirety.

What is claimed is:

1. A power supply apparatus comprising:
    a first power supply unit configured to operate in a first mode in which a first DC voltage is generated from an AC voltage or in a second mode in which a second DC voltage lower than the first DC voltage is generated; and
    a controller configured to control switching of the first power supply unit from the first mode to the second mode or from the second mode to the first mode;
    wherein
    the first power supply unit performs an intermittent oscillation operation when operating in the second mode,
    the second DC voltage changes within a predetermined range due to the intermittent oscillation operation,
    the power supply apparatus further comprising a switch configured to output, when in an ON state, the first DC voltage or the second DC voltage generated by the first power supply unit to a load located at a following stage, and to turn off, when in an OFF state, the output of the first DC voltage or the second DC voltage to the load,
    wherein the switch starts to operate when the second DC voltage is outside the predetermined range, and
    the controller performs control such that when the first power supply unit is switched from the second mode to the first mode, the switching from the second mode to the first mode is performed after the switch is turned on to the ON state.

2. The power supply apparatus according to claim 1, further comprising
    a second power supply unit configured to generate from the first DC voltage or the second DC voltage a third DC voltage lower than or equal to the first DC voltage or the second DC voltage,
    wherein the controller operates by being supplied with the third DC voltage generated by the second power supply unit.

3. A power supply apparatus comprising:
    a first power supply unit configured to operate in a first mode in which a first DC voltage is generated from an AC voltage or in a second mode in which a second DC voltage lower than the first DC voltage is generated;
    a second power supply unit configured to generate from the first DC voltage or the second DC voltage a third DC voltage lower than the first DC voltage or the second DC voltage and to output the third DC voltage to a load; and a controller configured to control switching of the first power supply unit from the first mode to the second mode or from the second mode to the first mode;
wherein
the first power supply unit performs an intermittent oscillation operation when operating in the second mode,
the second DC voltage changes within a predetermined range due to the intermittent oscillation operation,
the power supply apparatus further comprising a switch connected between the first power supply unit and the second power supply unit and configured to output, when in an ON state, the first DC voltage or the second DC voltage generated by the first power supply unit to the second power supply unit, and to turn off, when in an OFF state, the output of the first DC voltage or the second DC voltage to the second power supply unit,
wherein the second power supply unit is configured such that a start voltage at which the second power supply unit starts operate is within the predetermined range and a stop voltage at which the second power supply unit stops operation is lower than the start voltage and outside the predetermined range, or such that the start voltage is outside the predetermined range and the stop voltage is within the predetermined range, and
the controller performs control such that when the first power supply unit is switched from the second mode to the first mode, the switching from the second mode to the first mode is performed after the switch is turned on to the ON state.

4. The power supply apparatus according to claim 3, wherein the start voltage at which the second power supply unit starts operate is within the predetermined range and the stop voltage at which the second power supply unit stops operation is lower than the second DC voltage.

5. The power supply apparatus according to claim 3, wherein the second power supply unit is capable of starting while a voltage generated by the first power supply unit is increasing from the second DC voltage toward the first DC voltage, and is capable of stopping while the voltage generated by the first power supply unit is within the predetermined range.

6. A power supply apparatus comprising:
a first power supply unit configured to operate in a first mode in which a first DC voltage is generated from an AC voltage or in a second mode in which a second DC voltage lower than the first DC voltage is generated;
a second power supply unit configured to generate from the first DC voltage or the second DC voltage a third DC voltage lower than the first DC voltage or the second DC voltage and to output the third DC voltage to a load; and
a controller configured to control switching of the first power supply unit from the first mode to the second mode or from the second mode to the first mode;
wherein
the first power supply unit performs an intermittent oscillation operation when operating in the second mode,
the second DC voltage changes within a predetermined range due to the intermittent oscillation operation,
the power supply apparatus further comprising a switch connected between the first power supply unit and the second power supply unit and configured to output, when in an ON state, the first DC voltage or the second DC voltage generated by the first power supply unit to the second power supply unit, and to turn off, when in an OFF state, the output of the first DC voltage or the second DC voltage to the second power supply unit, wherein the second power supply unit is configured such that a start voltage at which the second power supply unit starts operation is outside the predetermined range and a stop voltage at which the second power supply unit stops operation is lower than or equal to the start voltage and outside the predetermined range, and
the controller performs control such that when the first power supply unit is switched from the second mode to the first mode, the switching from the second mode to the first mode is performed after the switch is turned on to the ON state.

7. The power supply apparatus according to claim 6, wherein
the second power supply unit is capable of starting while a voltage generated by the first power supply unit is increasing from the second DC voltage toward the first DC voltage and capable of stopping while the voltage is decreasing from the first DC voltage toward the second DC voltage, and
the start voltage of the second power supply unit is higher than the stop voltage.

8. The power supply apparatus according to claim 6, wherein
the second power supply unit is capable of starting while a voltage generated by the first power supply unit is increasing toward the second DC voltage and capable of stopping while the voltage is decreasing from the second DC voltage, and
the start voltage of the second power supply unit is higher than the stop voltage.

9. The power supply apparatus according to claim 6, wherein the second power supply unit is capable of starting while a voltage generated by the first power supply unit is increasing toward the first DC voltage and capable of stopping while the voltage is decreasing from the second DC voltage.

10. The power supply apparatus according to claim 6, wherein the second power supply unit is configured such that the start voltage and the stop voltage are equal.

11. The power supply apparatus according to claim 1, wherein the load includes a capacitor.

12. An image forming apparatus comprising:
a first power supply unit configured to operate in a first mode in which a first DC voltage is generated from an AC voltage or in a second mode in which a second DC voltage lower than the first DC voltage is generated; and
a controller configured to control switching of the first power supply unit from the first mode to the second mode or from the second mode to the first mode;
wherein
the first power supply unit performs an intermittent oscillation operation when operating in the second mode, and
the second DC voltage changes within a predetermined range due to the intermittent oscillation operation,
the image forming apparatus further comprising a switch configured to output, when in an ON state, the first DC voltage or the second DC voltage generated by the first power supply unit to a load located at a following stage, and to turn off, when in an OFF state, the output of the first DC voltage or the second DC voltage to the load,
wherein the switch starts to operate when the second DC voltage is outside the predetermined range, and
the controller performs control such that when the first power supply unit is switched from the second mode to the first mode, the switching from the second mode to the first mode is performed after the switch is turned on to the ON state.

13. The image forming apparatus according to claim 12, further comprising
   a second power supply unit configured to generate from the first DC voltage or the second DC voltage a third DC voltage lower than or equal to the first DC voltage or the second DC voltage,
   wherein the controller operates by being supplied with the third DC voltage generated by the second power supply unit.

14. An image forming apparatus comprising:
   a first power supply unit configured to operate in a first mode in which a first DC voltage is generated from an AC voltage or in a second mode in which a second DC voltage lower than the first DC voltage is generated; and
   a second power supply unit configured to generate from the first DC voltage or the second DC voltage a third DC voltage lower than the first DC voltage or the second DC voltage and to output the third DC voltage to a load; and
   a controller configured to control switching of the first power supply unit from the first mode to the second mode or from the second mode to the first mode;
   wherein
   the first power supply unit performs an intermittent oscillation operation when operating in the second mode,
   the second DC voltage changes within a predetermined range due to the intermittent oscillation operation,
   the image forming apparatus further comprising a switch connected between the first power supply unit and the second power supply unit and configured to output, when in an ON state, the first DC voltage or the second DC voltage generated by the first power supply unit to the second power supply unit, and to turn off, when in an OFF state, the output of the first DC voltage or the second DC voltage to the second power supply unit,
   wherein the second power supply unit is configured such that a start voltage at which the second power supply unit starts operate is within the predetermined range and a stop voltage at which the second power supply unit stops operation is lower than the start voltage and outside the predetermined range, or such that the start voltage is outside the predetermined range and the stop voltage is within the predetermined range, and
   the controller performs control such that when the first power supply unit is switched from the second mode to the first mode, the switching from the second mode to the first mode is performed after the switch is turned on to the ON state.

15. The image forming apparatus according to claim 14, wherein the start voltage at which the second power supply unit starts operate is within the predetermined range and the stop voltage at which the second power supply unit stops operation is lower than the second DC voltage.

16. The image forming apparatus according to claim 14, wherein the second power supply unit is capable of starting while a voltage generated by the first power supply unit is increasing from the second DC voltage toward the first DC voltage, and is capable of stopping while the voltage generated by the first power supply unit is within the predetermined range.

17. An image forming apparatus comprising:
   a first power supply unit configured to operate in a first mode in which a first DC voltage is generated from an AC voltage or in a second mode in which a second DC voltage lower than the first DC voltage is generated;
   a second power supply unit configured to generate from the first DC voltage or the second DC voltage a third DC voltage lower than the first DC voltage or the second DC voltage and to output the third DC voltage to a load; and
   a controller configured to control switching of the first power supply unit from the first mode to the second mode or from the second mode to the first mode;
   wherein
   the first power supply unit performs an intermittent oscillation operation when operating in the second mode,
   the second DC voltage changes within a predetermined range due to the intermittent oscillation operation,
   the image forming apparatus further comprising a switch connected between the first power supply unit and the second power supply unit and configured to output, when in an ON state, the first DC voltage or the second DC voltage generated by the first power supply unit to the second power supply unit, and to turn off, when in an OFF state, the output of the first DC voltage or the second DC voltage to the second power supply unit,
   wherein the second power supply unit is configured such that a start voltage at which the second power supply unit starts operation is outside the predetermined range and a stop voltage at which the second power supply unit stops operation is lower than or equal to the start voltage and outside the predetermined range, and
   the controller performs control such that when the first power supply unit is switched from the second mode to the first mode, the switching from the second mode to the first mode is performed after the switch is turned on to the ON state.

18. The image forming apparatus according to claim 17, wherein
   the second power supply unit is capable of starting while a voltage generated by the first power supply unit is increasing from the second DC voltage toward the first DC voltage and capable of stopping while the voltage is decreasing from the first DC voltage toward the second DC voltage, and
   the start voltage of the second power supply unit is higher than the stop voltage.

19. The image forming apparatus according to claim 17, wherein
   the second power supply unit is capable of starting while a voltage generated by the first power supply unit is increasing toward the second DC voltage and capable of stopping while the voltage is decreasing from the second DC voltage, and
   the start voltage of the second power supply unit is higher than the stop voltage.

20. The image forming apparatus according to claim 15, wherein the second power supply unit is capable of starting while a voltage generated by the first power supply unit is increasing toward the first DC voltage and capable of stopping while the voltage is decreasing from the second DC voltage.

21. The image forming apparatus according to claim 17, wherein the second power supply unit is configured such that the start voltage and the stop voltage are equal and the second power supply unit is capable of starting and stopping outside the predetermined range.

22. The image forming apparatus according to claim 12, wherein the load includes a capacitor.

* * * * *